United States Patent
Rauer et al.

(10) Patent No.: US 6,925,412 B2
(45) Date of Patent: Aug. 2, 2005

(54) METHOD FOR ADJUSTING A SENSOR DEVICE FOR DETERMINING THE ROTATIONAL POSITION OF AN ELECTRONICALLY-COMMUTATED MOTOR ROTOR

(75) Inventors: Manfred Rauer, Sankt Georgen (DE); Helmut Hans, Sankt Georgen (DE)

(73) Assignee: Minebea Co., Ltd., Nagano-ken (JP)

(*) Notice: Subject to any disclaimer, the term of this patent is extended or adjusted under 35 U.S.C. 154(b) by 0 days.

(21) Appl. No.: 10/671,945

(22) Filed: Sep. 29, 2003

(65) Prior Publication Data

US 2004/0128106 A1 Jul. 1, 2004

(30) Foreign Application Priority Data

Nov. 15, 2002 (DE) .......................................... 102 53 388

(51) Int. Cl.[7] .............................................. G06F 15/00
(52) U.S. Cl. ........................................ 702/151; 702/150
(58) Field of Search .......................... 318/244; 341/112, 341/116, 117; 702/127, 150, 151, 94, 104; 123/339.26

(56) References Cited

U.S. PATENT DOCUMENTS

| | | | | |
|---|---|---|---|---|
| 4,064,761 A | * | 12/1977 | Giers et al. ................... | 73/462 |
| 4,458,532 A | * | 7/1984 | Goebel ........................ | 73/462 |
| 4,746,859 A | * | 5/1988 | Malik ..................... | 324/207.12 |
| 4,888,509 A | * | 12/1989 | Tomasek ...................... | 310/42 |
| 5,032,998 A | * | 7/1991 | Filleau ....................... | 701/41 |
| 5,041,979 A | * | 8/1991 | Hirka et al. ................ | 701/102 |
| 5,378,976 A | * | 1/1995 | Inaji et al. .................. | 318/810 |
| 5,530,326 A | * | 6/1996 | Galvin et al. ............... | 318/254 |
| 5,610,457 A | * | 3/1997 | Kurita ....................... | 310/68 B |
| 5,637,974 A | * | 6/1997 | McCann ...................... | 318/701 |
| 6,163,117 A | * | 12/2000 | Rappenecker ............... | 318/254 |
| 6,354,396 B1 | * | 3/2002 | Horton et al. .............. | 180/446 |
| 6,400,109 B1 | | 6/2002 | Helmut | |
| 6,584,428 B1 | * | 6/2003 | Irle et al. .................... | 702/151 |
| 6,597,141 B1 | * | 7/2003 | Wilson-Jones et al. ..... | 318/560 |
| 2004/0017189 A1 | * | 1/2004 | Gyoergy et al. ....... | 324/207.22 |

FOREIGN PATENT DOCUMENTS

| | | |
|---|---|---|
| DE | 3742357 A1 | 4/1990 |
| DE | 19650908 | 6/1997 |
| DE | 19639316 | 5/1999 |
| DE | 19812966 | 9/1999 |
| DE | 10033561 | 6/2001 |
| DE | 19647897 | 6/2001 |
| DE | 10118072 | 11/2001 |

OTHER PUBLICATIONS

Gasulla, M; Xiujun Li;Meijer, G; Van Der Ham, L; Spronck, J;"A Contactless Capacitive Angular–Position Sensor"; Proceedings of IEEE Sensors 2002; Jun. 12–14, 2002; vol. 2; pp 880–884.* http://www.renco.com/106014.htm; Apr. 11, 2001.* http://www.motionvillage.com/training/handbook/drive/motorcontrol/commutation.html; Aug. 15, 2002.*

Becerra, R; Ehsani, M; Miller, T;"Commutation of SR Motors";IEEE Transactions on Power Electronics; vol. 8, issue 3; Jul. 1993; pp 257–263.*

* cited by examiner

Primary Examiner—Bryan Bui
Assistant Examiner—Douglas N. Washburn
(74) Attorney, Agent, or Firm—Duane Morris LLP

(57) ABSTRACT

The invention relates to a method for adjusting a sensor device for determining the rotational position of an electronically-commutated motor with rotor and stator, where the sensor device is fitted in a specific position relative to the rotor, the increments generated by the sensor device being recorded while the rotor is rotating, the angular position of the rotor being recorded while the rotor is rotating, and the correlation of the recorded angular position with the sensor device increments being subsequently saved.

14 Claims, 6 Drawing Sheets

METHOD FOR ADJUSTING A SENSOR DEVICE FOR DETERMINING THE ROTATIONAL POSITION OF AN ELECTRONICALLY-COMMUTATED MOTOR ROTOR

The application claims priority to the filing date of German Patent Application No. 102 53 388.1 filed Nov. 15, 2002, the specification of which is incorporated herein in its entirety.

FIELD OF THE INVENTION

The invention relates to a method for adjusting a sensor device for determining the rotational position of an electronically-commutated motor rotor.

The invention is mainly utilized for brushless, electronically-commutated direct current (DC) motors. It can also be used with other electrical motors.

BACKGROUND OF THE INVENTION

Motors of this kind can be used in a variety of applications for example in automotive engineering for drives supporting brake system control, or pumps and fans. Other application areas include ventilator fans in power supply units, or spindle motors in disk drives for data processing systems, just to mention a few.

An electronically-commutated, brushless DC motor basically consists of a shaft, a rotor assembly equipped with one or more permanent magnets mounted on the shaft, and a stator assembly which incorporates a stator component and phase windings. Two bearings are mounted at an axial distance to each other on the shaft to support the rotor assembly and stator assembly relative to each other.

FIG. 1 illustrates a schematic circuit diagram of an electronic control for a three-phase DC motor. The DC motor has three phase windings (U, 12; V, 14; W, 16), schematically illustrated in FIG. 1 in star connection 10. The three windings 12, 14, 16 are connected between a positive supply busbar 18 and a negative supply busbar 20. The positive supply busbar 18 conveys the potential $+U_{BAT}$, the negative supply busbar 20 conveys the potential $-U_{BAT}$. The phase windings 12, 14, 16 are connected in accordance with control signals with the supply buses 18, 20 via six power switching components (T1, 22; T2, 24; T3, 26; T4, 28; T5, 30; T6, 32). The power switching components 22 to 32 are preferably power transistors. They are equipped with control connections, designated G1 to G6 in FIG. 1. The control connections correspond in particular with the power transistor gates. The application of suitable control signals to the power transistor gates energizes the phase windings 12 to 16 in the DC motor in order to control its operation. Methods for controlling a brushless electronically-commutated DC motor which are referred to are, for example, described in DE 10033561 A1 and U.S. Pat. No. 6,400,109 B1.

One differentiates between square-wave and sinusoidal motors when dealing with DC motors, particularly three-phase DC motors as used in industrial applications in automotive engineering. Square-wave energizing means that the current applied to the phase windings flows in a square pattern. The current is activated to a specified value at a given moment in time and deactivated again at another specified moment in time. Such motors usually have a trapezoidal induced voltage. FIG. 2A schematically illustrates the induced voltages of a square-wave energized or square-wave commutated motor. Switching of the phase currents should occur during operation if two induced voltages intersect, this then minimizing the torque ripple generated. Information pertaining to the respective rotor is required to switch the phase currents at the correct instance.

Detailed information about the rotor position is required if the current is not only to be activated and deactivated, but also controlled in direct relation to the rotor position. Current control $i(\phi)$ is practical, as torque formation can be influenced by suitable setting of $i(\phi)$:

$$T(\phi) = K_T(\phi) * i(\phi)$$

For example, a consistent torque can be achieved on the basis of the following equations:

$$\sin^2(\varphi) + \sin^2\left(\varphi - \frac{\pi}{2}\right) = 1 \text{ or}$$

$$\sin^2(\varphi) + \sin^2\left(\varphi - \frac{2\pi}{3}\right) + \sin^2\left(\varphi - \frac{4\pi}{3}\right) = 1$$

if the induced voltage $U_{ind}(\phi)$ and, consequently, $K_E(\phi)$ and/or $K_T(\phi)$ and the current $i(\phi)$ have a sinusoidal flow, voltage and current are in phase and the individual motor phases (e.g. 90 electrical degrees in the case of a two-phase motor and 120 electrical degrees in the case of a three-phase motor) are shifted in relation to each other.

FIG. 2B illustrates the induced voltages of a three-phase motor. Energizing of the DC motor phases should be realized as illustrated in FIG. 2C. It consists of six sections during an electrical cycle.

The exact position of the rotor must be known to generate a sinusoidal current directly dependent on the rotor position and, consequently, the induced voltage. Decoders or resolvers are among the devices utilized in the prior art to record the rotor position. These are rotor position sensors which operate with a specific resolution $N_{INC}$ and can indicate the angular position of the rotor with an angular resolution of:

$$\varphi_{INC} = \frac{360°}{N_{INC}}$$

The current $i(\phi)$ for energizing the motor phases can be controlled in a suitable number of stages, relative to the rotor position sensor resolution.

A resolver is, in principle, similar to a transformer with a primary winding and two secondary windings. The winding ratio and polarity of the primary and secondary windings varies, depending on the angular position of the shaft. The resolver has at least two secondary windings at an angle of 90° to each other which are stationary fittings (stator). The primary winding is mounted on the resolver shaft and is termed the rotor. The stator output signals have the same frequency if the alternating voltage is induced at a constant frequency in the primary winding, but they are offset by 90°. A sinusoidal signal and co-sinusoidal signal are thus received. The peak resolver voltage varies as the shaft rotates.

The coil output signal is converted by an analog/digital converter, the two highest converter output signal bit values indicating the quadrant in which the shaft is, and the remaining bits the shaft angle at the start of each quadrant. The analog/digital converter output signal is always a binary number.

Decoders (also known as incremental decoders) generate two output signals using a glass disk (to give an example) in which uniform subdivisions are etched. There is a light source on one side of the disk and two light detectors on the other. The glass disk is mounted on the shaft, the light source and detectors being stationary components. The detectors record an interruption in the light beam caused by the disk when the disk rotates. A relative shaft rotation can be determined by counting the transitions from light to dark. Two detectors are used if the rotational direction is also to be recorded. Decoders of the type described can only record incremental shaft rotation. The absolute shaft position is recorded by a third sensor with the assistance of a so-called zero index or zero reference track.

The rotor position sensor provides data required for current control. A problem arises here, namely that the angular position of the rotor position sensor relative to the rotor is initially unknown. The prior art thus requires mechanical adjusting of the rotor position sensor relative to the rotor so that the rotor position sensor zero index coincides with a known specific rotor angular position. In particular the zero index should be adjusted relative to a certain known commutation position. Mechanical adjustment is relatively time consuming and inaccurate.

SUMMARY OF THE INVENTION

The invention therefore specifies a method for adjusting a sensor device for determining the rotational position of an electronically-commutated DC motor rotor which is simple and less prone to error.

This task has been solved by employing a method according to claim 1. The invention also provides a system for adjusting a sensor device, in accordance with claim 12.

According to the invention, the method employed involves the mounting of the sensor device in a specific position relative to the rotor and the recording of increments generated by the sensor device during a revolution of the rotor. Furthermore, the angular position of the rotor during a revolution of the rotor is also recorded. This angular position can be determined in absolute values or in relation to one or more commutation angles. The angular position recorded is subsequently correlated with the sensor device increments, and the correlation of angular position and sensor device increments is saved. The method employed in the invention therefore does not involve mechanical alignment of the sensor device when installing the motor, but rather the recording of the zero index position of the sensor device relative to the respective commutation positions through measurement in increments. Increments of different positions can then be saved in a non-volatile memory in the position sensor electronic module.

The invention not only has the advantage of rendering mechanical adjusting of the sensor device superfluous, but increments of each phase transition can be independently determined and saved for varying phase spacing of different motors.

The method employed in the invention should at least involve the allocation of a corresponding sensor device increment to each commutation angle, starting with the zero index. Each sensor device increment should preferably be allocated to a specific sensor angular position.

The preferred embodiment of the invention involves the counting and saving of the number of sensor device increments from the zero index to the commutation angle. The same sensor device can thus be set for different motors with different pole number ratios and, consequently, different commutation angles, without altering the sensor device itself. The angular position sought can be determined with even greater accuracy through interpolation, provided a commutation angle or another sought rotor angular position lies between two sensor device increments.

The motor is run externally in order to adjust the sensor device, and the induced voltages are recorded to determine the absolute position of the rotor shaft and the required commutation angle. Back-EMF (EMF=electronic motor force) can be measured for recording purposes. The preferred embodiment of the invention also generates a signal at each instance when a sought commutation angle is detected to mark the recorded angular position as a commutation position and save the current absolute position of the sensor device (i.e. the current incremental value). As previously mentioned, different commutation angles can be determined, depending on the pole number ratio of the motor.

The invention also involves an electronically-commutated motor with rotor and stator and a sensor device for determining the rotational position of the rotor, the sensor device being fitted in a specific position relative to the rotor, with a storage unit for saving a correlation of the rotor angular position and the sensor device increments, and a control unit for motor control governed by the sensor device output signals and the saved correlation.

The invention also involves a system for adjusting a sensor device in accordance with claims 12 to 14.

BRIEF DESCRIPTION OF THE DRAWINGS

The invention is explained in greater detail below on the basis of a preferred embodiment and with reference to the drawings.

DETAILED DESCRIPTION OF PREFERRED EMBODIMENTS

Figure 1:
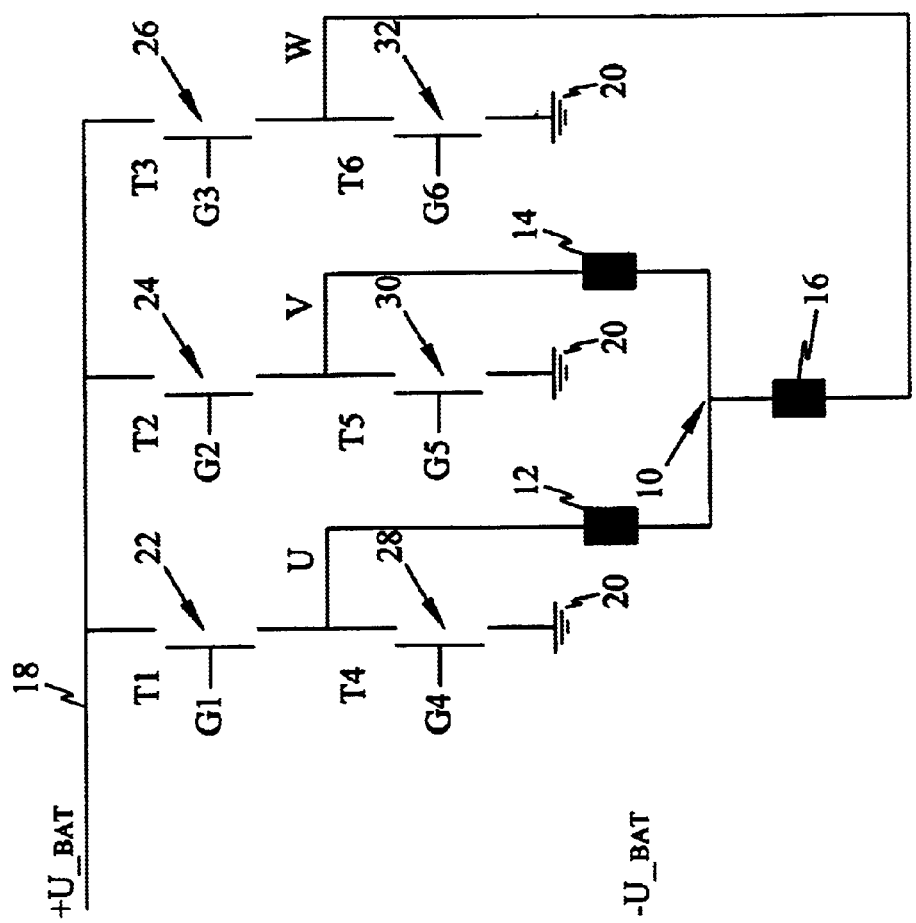
FIG. 1 shows a circuit diagram of the electronic control for a three-phase DC motor.

FIG. 1, which has already been described, illustrates a schematic circuit diagram of an electronic control for a three-phase DC motor. The transistors T1 to T6, 22 to 32 are actuated via gates G1 to G6 to energize the three phases (U 12, V 14 and W 16) of the DC motor. The actuating instances are determined by the sensor device output signals which are set in accordance with the invention.

Figure 2A:
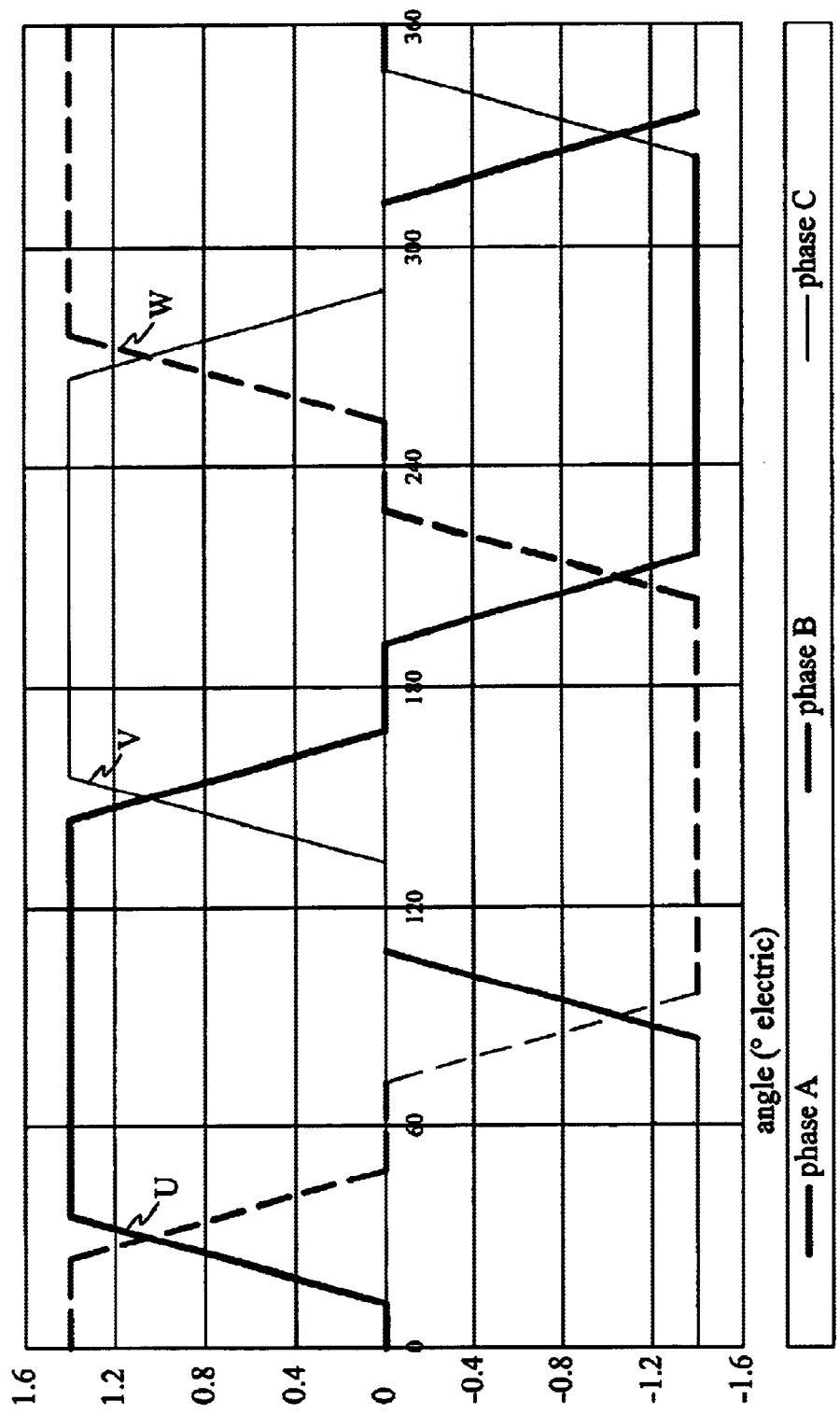
FIG. 2A shows the voltage waveform induced by a square-wave energized three-phase DC motor.
Figure 2B:
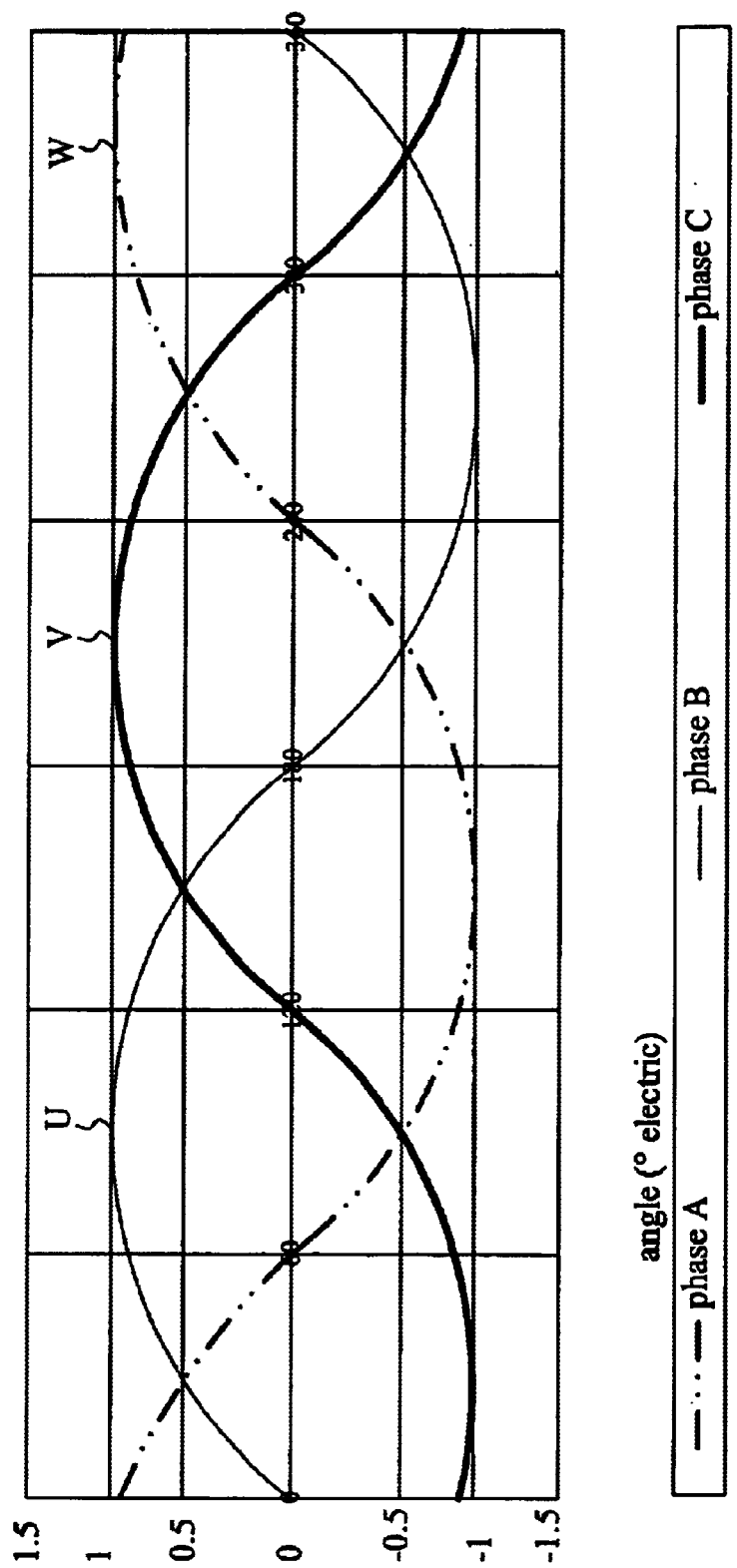
FIG. 2B shows the voltage waveform induced by a sinusoidal energized three-phase DC motor.

FIG. 2B illustrates the induced voltages of a three-phase DC motor with sinusoidal energizing or commutation, the induced voltages of the three-phase DC motor being designated u, v and w. FIG. 2B illustrates an electrical cycle of 360° of the energizing phase.

Figure 2C:
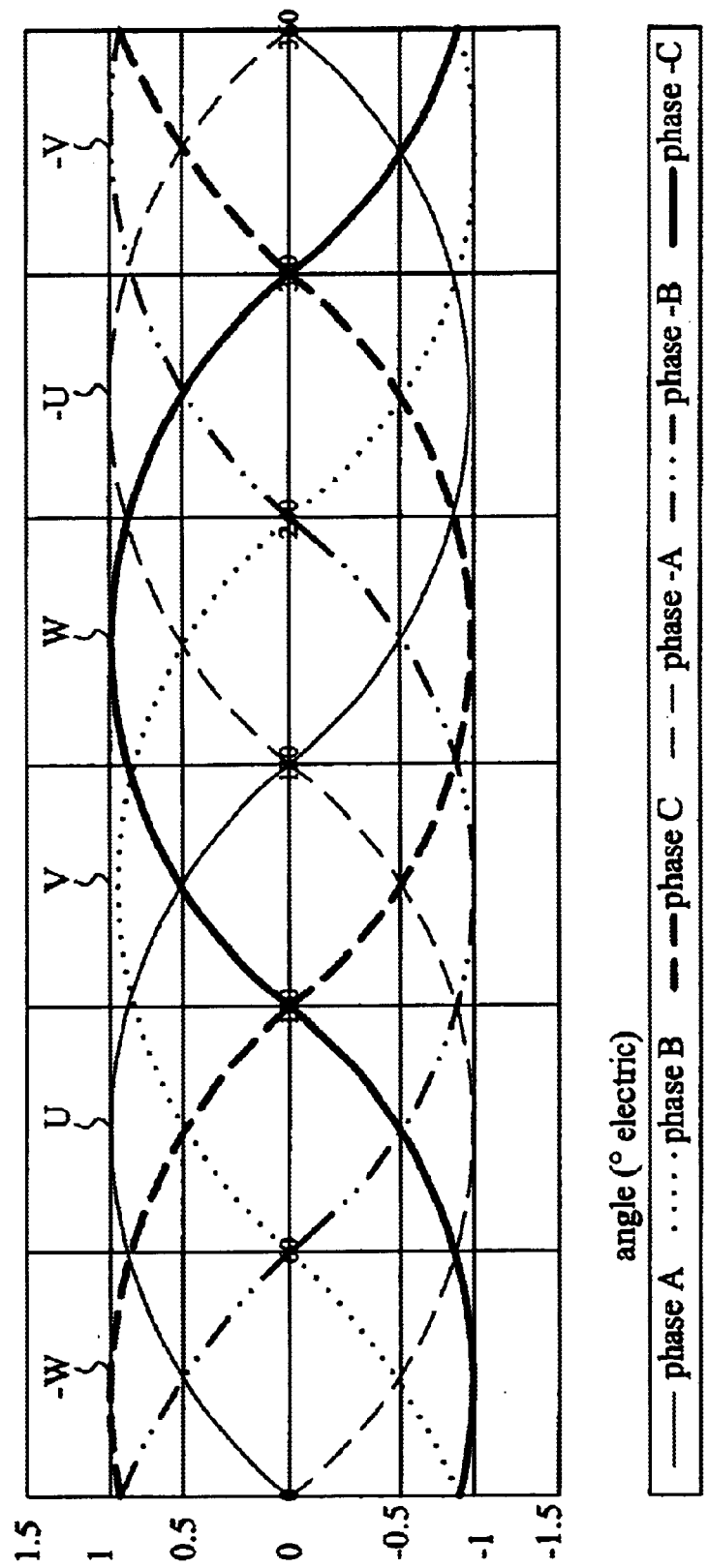
FIG. 2C shows the energizing of a three-phase DC motor during an electrical cycle.

FIG. 2C illustrates the energizing of the three-phase DC motor during an electrical cycle which consists of three sections, designated u, v, w, −u, −v and −w. The u, v, w, −u, −v and −w curves represent the currents applied to windings U, 12, V, 14 and W, 16 via transistors T1 to T6, 22 to 32 in FIG. 1.

According to the present invention, the method employed to adjust the sensor device or the rotor position sensor involves recording of the increments generated by the sensor device during a revolution of the rotor, while simultaneously recording the angular position of the rotor during a revolution of the rotor. The angular position recorded is correlated with the sensor device increments, and the correlation of angular position and sensor device increments is saved. The number of sensor device increments between the zero index and each commutation angle in particular should be recorded and saved.

Figure 3:
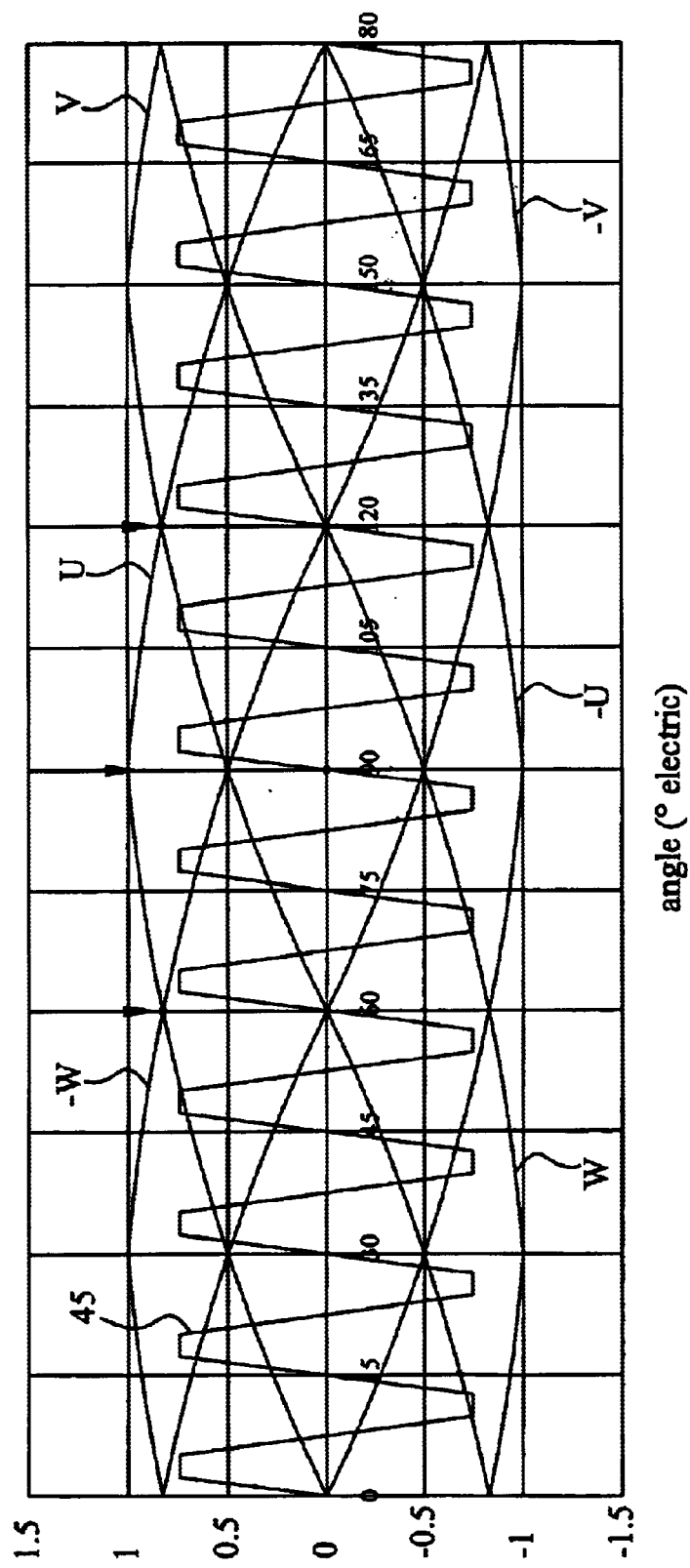
FIG. 3 shows the energizing of a three-phase DC motor during half an electrical cycle and the corresponding rotor position sensor signals according to the invention.

FIG. 3 shows an illustration similar to that in FIG. 2C, although FIG. 3 only illustrates the flow of currents during half a period or revolution of the DC motor (i.e. 180 electrical degrees). Currents are designated u, v, w, −u, −v and −w, as in FIG. 2C. The commutation angles sought are marked with arrows at three different positions in this drawing.

The output signal of a rotor position sensor is also schematically illustrated and marked by 45 in FIG. 3. The rotor position sensor resolution shown in FIG. 3 is only equivalent to 24 increments in each electrical cycle, although technicians will realize that this resolution is only intended as an example, and that a considerably higher sensor device resolution is selected under practical conditions. Sensor device resolution can be between 512 and 32768 increments. It is also assumed that the DC motor in the present example has four pole pairs.

The switching instances are marked with arrows in FIG. 3. They are equivalent to the respective commutation angles and are correlated and saved with the respective sensor device increment in accordance with the method employed in the invention, correlation starting at the zero index. The present invention does not require that a rotor position sensor increment coincide every time with a switching instance, as switching instances can be re-determined through interpolation of two rotor position sensor increments if necessary (in accordance with the method employed in the current invention).

Figure 4:
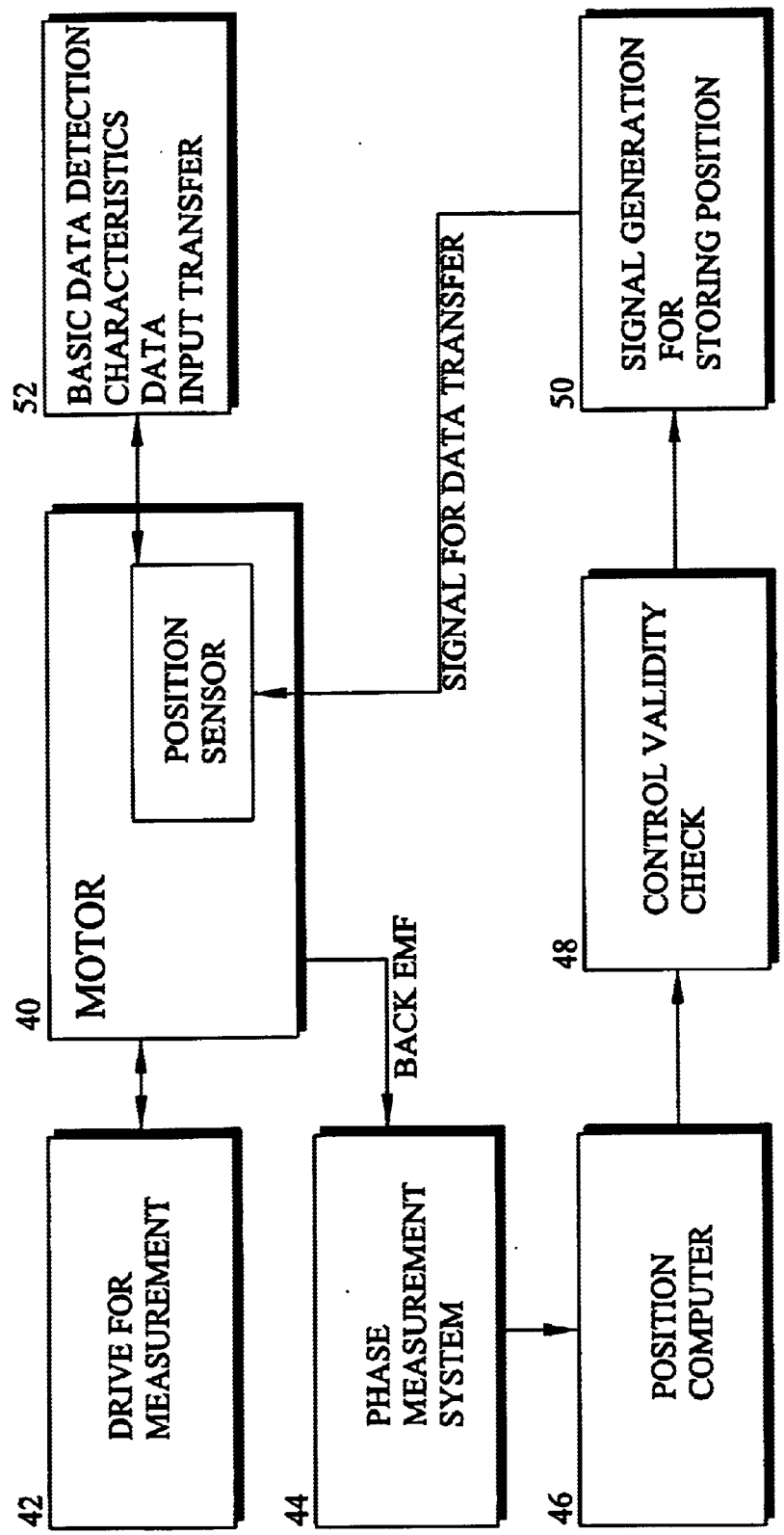
FIG. 4 shows a block diagram of a system for adjusting a sensor device according to the invention.

FIG. 4 illustrates a block diagram of a system for adjusting a sensor device according to the invention. A brushless electronically-commutated DC motor is schematically illustrated in FIG. 4 using a box 40. An external drive 42 is allocated to the motor 40 used for adjusting the sensor device. A phase measuring system 44 and position computer 46 are linked to the motor 40. A monitoring stage 48 is connected downstream from the position computer 46 which checks the validity of the measurement and sends an output signal to a signal stage 50. The signal stage 50 generates a signal pulse which triggers saving of the position data. The motor 40 is equipped with a rotor position sensor which generates a reference signal that indicates the absolute angular position of the rotor shaft in increments. This rotor position sensor can be a high-resolution reference sensor or the sensor device itself. The data import signal pulse is transmitted to the motor 40, the motor 40 incorporating the sensor device and an associated memory in which the current absolute angular position of the shaft in increments can be saved as a commutation position.

According to the present invention, the motor 40 is powered by the external drive 42. Voltage is induced during this in the phase windings of the motor, as illustrated in FIGS. 2A and 3. Induced voltages are recorded by measuring the back-EMF so as to determine the absolute position of the rotor shaft and the respective commutation angle. The phase measuring system 44 and position computer 46 are provided for this purpose. The monitoring stage 48 checks whether the measured values are valid for the DC motor 40.

The signal stage 50 generates at least one signal for every commutation angle which triggers the saving of a position and transmits a data import signal to the motor 40.

The motor 40 incorporates the sensor device and a memory and saves the absolute angular position as a commutation position on receiving a signal pulse. A special embodiment of the invention has an additional high-resolution position sensor for adjusting the sensor device which has a known zero index and transmits high-resolution reference increments to accurately determine the commutation angle. Differing numbers of commutation positions are saved, depending on the motor pole number involved (square-wave energizing). The system can thus adapt automatically to different pole number ratios without altering the sensor device itself.

The exact position of the zero index is calculated with the aid of the differential factor determined in increments (relative to a back-EMF intersection) and saved in the position sensor. The zero index signal is thus transmitted to the motor electronic control at the correct moment while the motor is operating.

The data saved in the position sensor in the motor can also be utilized to illustrate absolute position information (using the increment angle correlation) and transmitted to the electronic control via a digital interface while the motor is operating. A serial or parallel interface can be used.

Commutation positions can be determined which lie between individual sensor device increments if a high-resolution position sensor is used for adjusting the sensor device. A special embodiment of the invention therefore includes an additional interpolation unit which interpolates individual sensor device increments to determine the commutation position with even greater accuracy.

The number of sensor device increments depends on a sensor device zero index been known. This can be determined with the aid of the high-resolution reference position sensor. Sensor device increments can each be calculated to one commutation position in whole numbers or fractions if this high-resolution reference position sensor is utilized.

The data storage option means that the motor in accordance with the invention can also save additional information in the motor itself and access this data at any time. An interface 52 can be provided in this respect for recording primary data and inputting characteristic data and other information via the motor (e.g. inputting a production number, production data and other motor data which can be useful for motor control).

The method and system employed in the invention enables the adjusting of a sensor device on an electronically-commutated motor without mechanical means, with adjustment according to the invention being realized in the form of a learn mode. The method according to the invention enables adjustment of the sensor device with considerably greater accuracy than mechanical adjustment of the sensor device in accordance with the prior art. Whereas deviations of ±2° from the respective commutation position were usual during adjustment in accordance with the prior art, the tolerances during adjustment in accordance with the invention are between one and two factors of magnitude less than these, depending on the resolution of the sensor device. For example, the step width of an increment is 360°:1024=0.35° if a decoder with a resolution of 1024 Bit is used as a sensor device. This means that the sensor device can be adjusted within very narrow tolerance ranges.

The characteristics disclosed in the above description, claims and the drawings can be significant for the realization of the invention, either individually or in any combination whatsoever.

IDENTIFICATION REFERENCE LIST

10 Star connection
12, 14, 16 Windings
18, 20 Supply busbar
22–32 Power switching components
40 Motor
42 Drive
44 Phase measuring system
45 Output signal of rotor position sensor
46 Position computer
48 Monitoring stage
50 Signal stage

What is claimed is:

1. A method for adjusting a sensor device for determining the rotational position of an electronically-commutated motor having a rotor and a stator, where the sensor device is mounted in a specific position relative to the rotor, the method comprising recording the increments generated by the sensor device during a revolution of the rotor, recording the angular position of the rotor during a revolution of the rotor, correlating the recorded angular position and the sensor device increments; and saving the correlation of the recorded angular position with the sensor device increments.

2. Method according to claim 1, wherein each sensor device increment is allocated to a specific angular position of the rotor.

3. Method according to claim 1, wherein the sensor device generates a zero index and the number of sensor device increments lying between the generation of the zero index and a motor commutation angle are counted.

4. Method according to claim 3, further comprising counting the number of sensor device increments lying between the generation of the zero index and each motor commutation angle.

5. Method according to claim 3, further comprising saving the number of sensor device increments from the zero index to the motor commutation angle.

6. Method according to claim 1, wherein the angular position of the rotor is recorded with a position sensor for sensor device adjustment, the resolution of the position sensor being equivalent to or higher than the resolution of the sensor device.

7. Method according to claim 1, further comprising interpolating the angular positions of the rotor between two sensor device increments.

8. Method according to claim 1, wherein the motor is powered, and the voltage induced by the motor is recorded, the angular position of the rotor and a sought commutation angle being derived from the induced voltage.

9. Method according to claim 8, wherein a signal is generated when recording the sought commutation angle which characterizes the recorded angular position as the commutation position.

10. Method according to claim 8, wherein several commutation angles are derived depending on the ratio of the number of motor poles involved.

11. An Electronically-commutated motor comprising a rotor, a stator and a sensor device utilized for recording the rotational position of the rotor, the sensor device mounted in a specific position relative to the rotor, with a storage unit for saving a correlation of the rotor angular position and the sensor device increments, and a control unit for motor control according to the sensor device output signals and the saved correlation.

12. A system for adjusting a sensor device having increments for determining the rotational position of a rotor in an electronically-commutated motor including a rotor, a stator and a sensor device, the system comprising:

a phase measuring unit for measuring the voltage induced by the rotor while the motor rotor is rotating;

a commutation computer for calculating a plurality of commutation instances based on the induced voltages;

a signal pulse generating unit which receives an input signal from the commutation computing unit and generates a signal pulse for each of the plurality of commutation instance, transmitting said signal pulse for the commutation instance to the motor;

and a storage unit for saving a correlation between the commutation instances and sensor device increments.

13. System according to claim 12, wherein the motor further comprises a reference position sensor for adjusting.

14. System according to claim 13, wherein the reference position sensor has a higher resolution than that of the sensor device, and the reference position sensor increments and the sensor device increments are correlated.

* * * * *